Dec. 13, 1938.                H. FROMM                    2,140,076
                             HOMOGENIZER
                        Filed March 1, 1937        2 Sheets-Sheet 1

Herbert Fromm
INVENTOR
BY Victor J. Evans & Co.
HIS ATTORNEYS

Dec. 13, 1938.    H. FROMM    2,140,076
HOMOGENIZER
Filed March 1, 1937    2 Sheets-Sheet 2

Herbert Fromm
INVENTOR
BY Victor J. Evans & Co.
HIS ATTORNEYS

Patented Dec. 13, 1938

2,140,076

UNITED STATES PATENT OFFICE 2,140,076

HOMOGENIZER

Herbert Fromm, Hamburg, Wis.

Application March 1, 1937, Serial No. 128,546

3 Claims. (Cl. 146—182)

My invention relates to the art of treating fruit juices for beverage purposes, and includes among its objects and advantages the provision of an improved homogenizer.

An object of my invention is to provide novel means for processing fruit juices for beverage purposes including means for converting the fruit juices to a homogeneous mass completely devoid of solids, whereby the fruit juices are more pleasing to the taste, smoother and easier to drink, and much sweeter.

A further object is to provide a device of the type described in which a gang of blades is employed for breaking and cutting solids in the fruit juice and in which the blades are so arranged as to be capable of processing a relatively large volume of liquid in a relatively short period of time.

Another object is to provide means for treating fruit juices in which a gang of blades is employed and rotated at a high speed and in which the blades are arranged in spiral formation about the axis of rotation of the gang so as to function in the nature of a screw capable of handling a large volume of liquid.

A further object is to provide a device of the type described in which a high speed rotary element is employed for breaking and cutting solids in the juices and in which novel means is employed for delivering juices to the element in such a manner as to eliminate splashing.

Another object is to provide a device of the type described in which novel means is employed for preventing occasional fruit seeds from passing into the bladed element.

Figure 1:
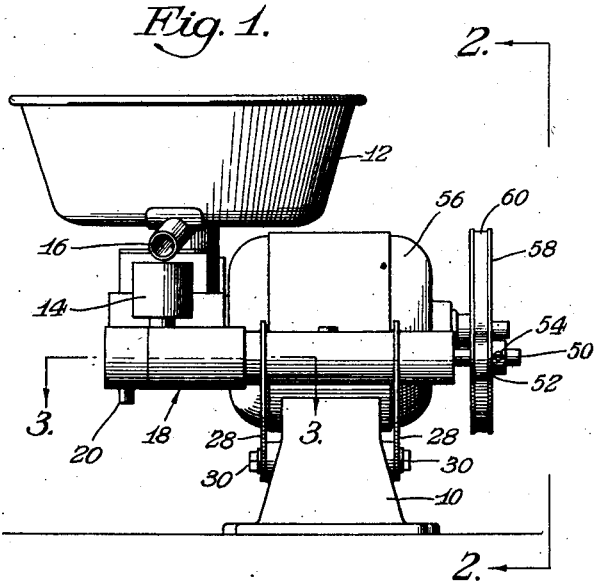
Fig. 1 is a side elevation of a machine embodying the invention.

In the embodiment selected to illustrate my invention, I make use of a base 10 which supports a bowl 12 into which fruit juices to be treated may be poured or within which a conventional reaming bulb (not shown) may be employed for extracting the juices from the fruit. From the bowl 12, the fruit juices flow to a receiving cup 14 through the spout 16 communicating with the bowl. The cup 14 delivers the fruit juice to the homogenizer 18, and the processed juice flows from the homogenizer through an outlet spout 20 ready for serving.

Specifically, the homogenizer 18 comprises a head 22 which is bored at 24 to frictionally receive one end of a tubular support 26 mounted on the base 10 through the medium of suitable brackets 28 which may be attached to the base 10 by screws 30.

Figure 3:
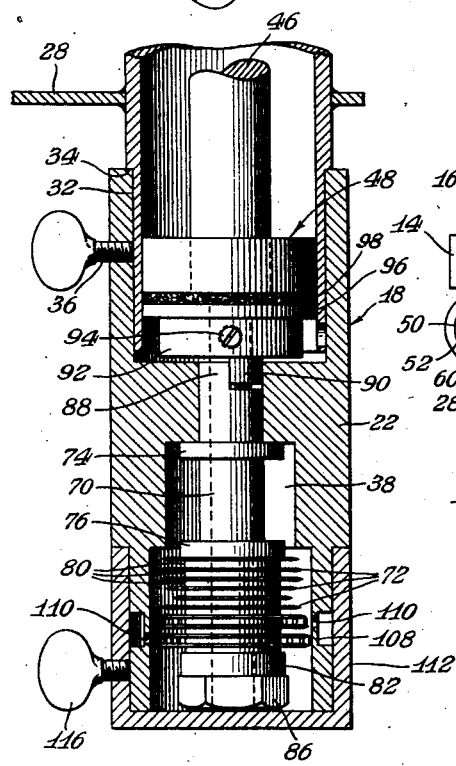
Fig. 3 is a sectional view along the line 3—3 of Fig. 1.
Figure 2:
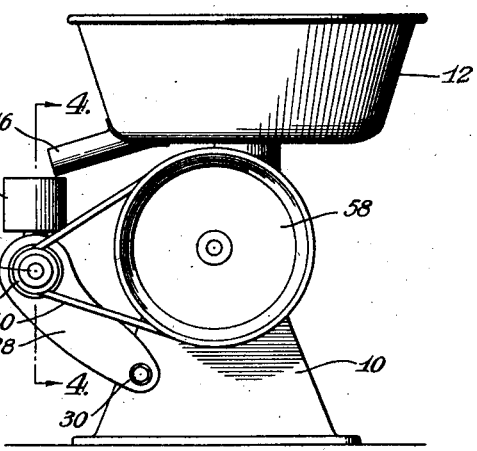
Fig. 2 is an end elevation.

I reduce the support 26 at 32 to provide a shoulder 34 against which the inner end of the head 22 abuts to secure precise positioning. Fig. 3 illustrates the head 22 as being provided with a set screw 36 for fixedly securing the head to the support 26.

Figure 4:
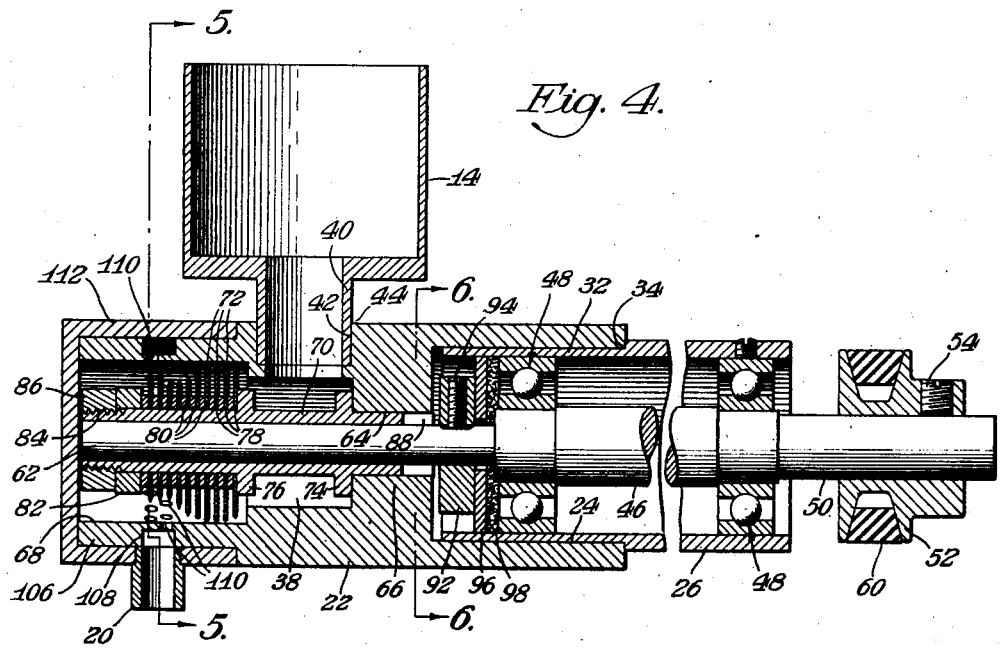
Fig. 4 is a sectional view along the line 4—4 of Fig. 2.

Referring to Fig. 4, the cup 14 communicates with the bore 38 in the head 22 through the medium of a neck 40 pressed into the bore 42 in the head. The neck 40 may be welded to the head, as indicated at 44. Within the support 26 I mount a shaft 46 which is supported by roller bearings 48. One end of the shaft 46 is extended at 50 to provide a mounting for a sheave 52 fixedly connected thereon by a set screw 54. Upon the base 10 I mount a motor 56 which drives a grooved pulley 58. A V-belt 60 connects the sheave 52 with the pulley 58 for driving the shaft 46.

The opposite end of the shaft 46 terminates in a reduced extension 62. The extension 62 projects through a bore 64 in the wall 66 and extends the full length of the bore 38 and the enlarged bore 68.

A sleeve 70 is mounted on the extension 62, which sleeve carries a gang of blades 72 for cutting and breaking pulp and fruit cells in the fruit juice. The sleeve 70 has slidable relation with the extension 62 and includes a flange 74 normally arranged in abutting relation with one side of the wall 66. A second flange 76 is carried by the sleeve 70 in spaced relation with the flange 74.

The blades 72 are provided with openings 78 for the reception of the sleeve 70. In Fig. 4, I illustrate the blades 72 as being held in spaced relation by spacers 80. The blade 72 at one end of the gang lies against the flange 76 while the spacer adjacent the outer face of the blade 72 at the other end of the gang lies adjacent a pressure ring 82 mounted on the sleeve 70. The sleeve is threaded at 84 for the reception of a nut 86 which clamps the gang of blades 72 and the spacers 80 into a fixed, unitary assembly with the sleeve 70.

To connect the sleeve 70 with the shaft extension 62 I provide the latter with a flange 88 which embraces the shaft extension thoroughout substantially 180°. The flange 88 is arranged in abutting relation with a similar flange 90 carried by a collar 92 fixedly connected with the extension 62 by a set screw 94 (see Fig. 3). It will thus be seen that rotation of the shaft 46 imparts rotary motion to the gang of blades 72. Between a washer 96 and the adjacent roller bearing assembly 48 I mount an oil sealing gasket 98.

In Fig. 4, I illustrate the bore 42 as being offset with respect to the gang of blades 72. The juices flow into the bore 38 between the flanges 74 and 76 and pass over the flange 76 into the bore 68 to be processed by the blades 72. I make the flange 76 of such diameter as to permit a large volume of liquid to flow into the chamber 68 but the space between the flange and the wall of the bore 38 is sufficiently small to prevent occasional seeds, such as from oranges, from passing into the knife chamber thereby protecting the blades from damage.

Figure 5:
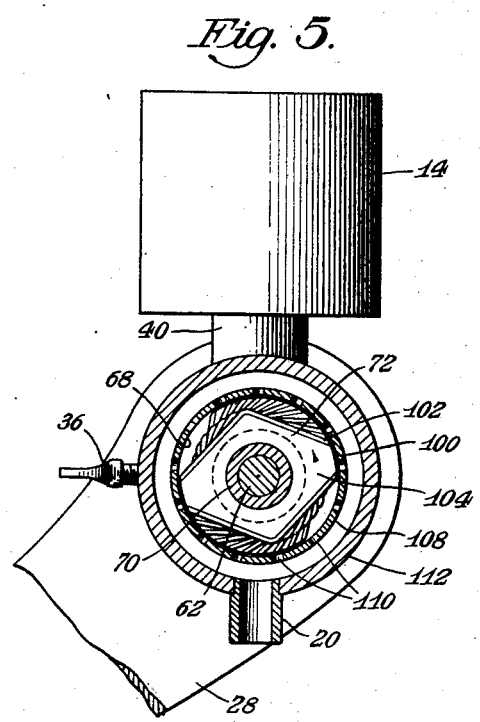
Fig. 5 is a sectional view along the line 5—5 of Fig. 4.
Figure 6:
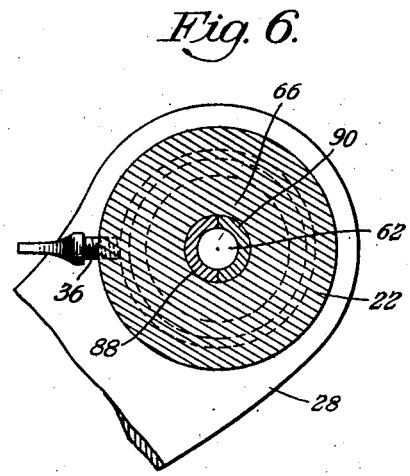
Fig. 6 is a sectional view along the line 6—6 of Fig. 4.

Referring to Fig. 5, the blades 72 are generally diamond-shaped in configuration with ends 100 having a curvature conforming to the bore 68 and terminating in slightly spaced relation with the wall of the bore so as to prevent frictional contact. Each blade is provided with four cutting edges 102. All the blades are identical in size and shape, but the blades are arranged in an offset manner so as to position the cutting edges in spiral formation about the sleeve 70.

The gang of blades 72 is rotated in the direction of the arrow 104. With the blades arranged in spiral formation and rotated in the direction of the arrow 104, the blades function in the nature of a screw, which sucks the fruit juice into the bore 68. Such sucking action on the fruit juice increases the capacity of the homogenizer. Because of the high speed of the rotating blades, centrifugal forces propel the fruit juice in the direction of the wall of the bore 68 so as to render the cutting edges more effective for pulp and cell reduction purposes. In arranging the gang of blades 72 in offset relation with the bore 42 I prevent any splashing of the juices, which might occur if the bore were positioned directly above the blades.

Since the fruit juices are delivered to the chamber 68 at one end of the gang of blades the inlet opening comprising the space between the flange 76 and the bore 38 extends completely around the flange thereby increasing its volume and eliminating obstructions. Because of the screw action of the blades in connection with centrifugal forces the outlet means for the juices comprises the channel 108, and the openings 110 may extend completely about the blade assembly which increases the volumetric capacity of the delivery of juices to the spout.

During operation, the flange 74 is pressed firmly against the wall 66 so as to prevent any leakage of juices into the bore 64 and the bearing assembly.

In the outer wall 106 of the head 22 I provide a groove 108 which communicates with the bore 68 through a plurality of small openings 110. The diameter of the wall 106 is smaller than the diameter of the head 22 to provide accommodation for a cap 112 which has an outside diameter equal to the outer diameter of the head. The cap 112 is arranged substantially in abutting relation with the nut 86, and the cap is fixedly connected with the head by a set screw 116. Groove 110 communicates with the spout 20.

In operation, the homogenizer unit cuts or breaks the solids, such as pulp and the juice cells into fine particles. The reduction action is such that the fruit juice is in the nature of a homogeneous mass completely devoid of solids such as are present in fruit juices extracted in the conventional manner. Thorough reduction of the solids provides a juice more pleasing to the taste, smoother and easier to drink and much sweeter. Because of the screw action peculiar to the specific arrangement of the blades, a large volume of juice may be run through the homogenizer in a relatively short period of time.

In making the blades 72 of the shape illustrated in Fig. 5, each blade includes two cutting edges which are more active in their cutting action than the remaining two edges when rotated in a given direction. With each blade provided with four cutting edges, provision is made for reversing the blades when the more active cutting edges become dull. The blades are easily removed from the sleeve 70 by merely unscrewing the nut 86. By removing the cap 112, the gang of blades 72 together with the sleeve 70 may be moved by merely pulling the sleeve off the shaft extension 62.

In securing the brackets 28 to the base 10 by the screws 30 provision is made for adjusting the brackets about the screws as axes for taking up slack in the belt 60.

Without further elaboration, the foregoing will so fully explain my invention that others may, by applying current knowledge, readily adapt the same for use under various conditions of service.

I claim:

1. In a homogenizer, a support including a power driven shaft, a head carried by said support and including a large bore and a small bore axially aligned therewith, said head having an inlet port, said power driven shaft extending through the small bore and into the large bore, a sleeve slidable on said power driven shaft but keyed thereto for rotation therewith, said sleeve having a flange abutting said head adjacent one end of the small bore, a second flange formed on said sleeve and spaced from the first flange, a gang of blades mounted upon said sleeve adjacent the second flange, and means for clamping the gang of blades against the second flange, said inlet port communicating with the large bore between the first and second flanges, the second flange being smaller in diameter than the large bore, to permit entrance of fruit juices into the zone of the blades but having sufficient diameter to restrain fruit seeds from entrance into cutting relation with the gang of blades.

2. In a homogenizer, a support including a power driven shaft, a head carried by said support and including a large bore and a small bore axially aligned therewith, said head having an inlet port, said power driven shaft extending through the small bore and into the large bore, a sleeve slidable on said power driven shaft but keyed thereto for rotation therewith, said sleeve having a flange abutting said head adjacent one end of the small bore, a second flange formed on said sleeve and spaced from the first flange, a gang of blades mounted upon said sleeve adjacent the second flange, and means for clamping the gang of blades against the second flange, said inlet port communicating with the large bore between the first and second flanges, the second flange being smaller in diameter than the large bore, to permit entrance of fruit juices into the zone of the blades but having sufficient diameter to restrain fruit seeds from entrance into cutting relation with the gang of blades, said head being provided with a removable cap having close fitting relation with one end of said sleeve, said head being provided with an outlet port, said head being provided with a groove extending about its exterior wall and aligned with the outlet port, said head being provided with perforations establishing communication with said groove and the large bore.

3. In a homogenizer, a support including a power driven shaft, a head carried by said support and including a large bore and a small bore axially aligned therewith, said head having an inlet port, said power driven shaft extending through the small bore and into the large bore, a sleeve slidable on said power driven shaft but keyed thereto for rotation therewith, said sleeve having a flange abutting said head adjacent one end of the small bore, a second flange formed on said sleeve and spaced from the first flange, a gang of blades mounted upon said sleeve adjacent the second flange, and means for clamping the gang of blades against the second flange, said inlet port communicating with the large bore between the first and second flanges, the second flange being smaller in diameter than the large bore, to permit entrance of fruit juices into the zone of the blades but having sufficient diameter to restrain fruit seeds from entrance into cutting relation with the gang of blades, said blades having cutting edges aligned in the formation of a spiral, the spiral alignment of the cutting edges reacting upon the fruit juices in such a manner as to urge the first flange into pressure relation with the head.

HERBERT FROMM.